United States Patent
Tsukagoshi (10) Patent No.: US 7,372,602 B2
(45) Date of Patent: *May 13, 2008

(54) METHOD FOR RECORDING AND REPRODUCING HOLOGRAPHIC DATA AND AN APPARATUS THEREFOR

(75) Inventor: Takuya Tsukagoshi, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,152

(22) Filed: Apr. 19, 2004

(65) Prior Publication Data

US 2004/0212859 A1 Oct. 28, 2004

(30) Foreign Application Priority Data

Apr. 23, 2003 (JP) ............................. 2003-118808

(51) Int. Cl.
G03H 1/04 (2006.01)
G03H 1/00 (2006.01)
G11B 7/00 (2006.01)

(52) U.S. Cl. ..................... 359/35; 359/30; 369/103; 369/112.1

(58) Field of Classification Search ............... 359/15, 359/1, 22, 32, 35, 30; 369/102, 103, 112.1, 369/44.11, 44.27, 112.01, 112.03
See application file for complete search history.

(56) References Cited

U.S. PATENT DOCUMENTS

| | | | |
|---|---|---|---|
| 4,870,508 A | | 9/1989 | Van Rosmalen et al. |
| 5,784,353 A | * | 7/1998 | Matsui ........................ 369/102 |
| 6,738,322 B2 | * | 5/2004 | Amble et al. ............. 369/44.27 |
| 6,909,529 B2 | * | 6/2005 | Curtis .......................... 359/30 |
| 7,031,038 B2 | | 4/2006 | Ogasawara et al. |

(Continued)

FOREIGN PATENT DOCUMENTS

DE 101 34 769 8/2006

(Continued)

*Primary Examiner*—Audrey Chang
(74) *Attorney, Agent, or Firm*—Seed IP Law Group PLLC (57) ABSTRACT

A holographic recording and reproducing method for recording data in a holographic recording medium comprising a recording layer in which data are to be recorded as phase information of light by projecting a signal beam and a reference beam thereonto and a servo layer disposed on the opposite side of the recording layer as viewed in the direction of signal beam incidence on the holographic recording medium and having regions in which servo projections are formed by projecting the signal beam and the reference beam onto the holographic recording medium and reproducing holographic data from the holographic recording medium by projecting the reference beam onto the holographic recording medium, the holographic recording and reproducing method includes steps of setting an optical path of the signal beam so that the signal beam is projected onto other regions of the servo layer than the regions formed with the servo projections, setting an optical path of a servo beam different from that of the signal beam so that the servo beam is projected onto one of the regions of the servo layer in which the servo projections are formed after passing through an objective lens through which the signal beam passes and projecting the servo beam onto the servo layer along the thus set optical path of the servo beam.

5 Claims, 6 Drawing Sheets

U.S. PATENT DOCUMENTS

| | | |
|---|---|---|
| 2002/0041564 A1 | 4/2002 | Yoshinari et al. |
| 2003/0063342 A1* | 4/2003 | Horimai ..................... 359/22 |
| 2004/0001400 A1 | 1/2004 | Amble et al. |
| 2004/0184122 A1* | 9/2004 | Tsukagoshi ................. 359/35 |

FOREIGN PATENT DOCUMENTS

| | | |
|---|---|---|
| JP | 06-168458 | 6/1994 |
| JP | 2001-291242 | 10/2001 |
| JP | 2001-357542 | 12/2001 |
| JP | 2002-063733 | 2/2002 |
| JP | 2002-63733 | 2/2002 |
| JP | 2002-123949 | 4/2002 |
| WO | 02/075727 | 9/2002 |

* cited by examiner

METHOD FOR RECORDING AND REPRODUCING HOLOGRAPHIC DATA AND AN APPARATUS THEREFOR

BACKGROUND OF THE INVENTION

The present invention relates to a method for recording and reproducing holographic data and an apparatus therefor, and more particularly, to a method for recording and reproducing holographic data and an apparatus therefor which can prevent noise from being generated in a reproduced beam or a servo beam.

DESCRIPTION OF THE PRIOR ART

The holographic method of recording and reproducing information is known as one method for realizing high-density information recording on a recording medium. In an ordinary holographic recording and reproducing method, information is recorded by overlapping a signal beam and a reference beam on the holographic recording medium to write the interference fringes formed thereby. The information recorded in the recording medium in this manner can be reproduced by irradiating the recording medium with the reference beam to generate a reproduced beam. Specifically, the reference beam projected onto the recording medium is diffracted by the diffraction grating formed by the interference fringes, thereby causing two-dimensional information to appear as reproduced information. In such a recording medium, since all of the image information carried by the signal beam is reproduced at one time, high speed reproduction can be realized.

In a conventional method for recording and reproducing holographic information, it is normal to cause a signal beam and a reference beam to enter a holographic recording medium with a predetermined angle therebetween when information is to be recorded and to spatially separate the reproduction light and the reference beam for reproducing information when information is to be reproduced, thereby preventing the reference beam from entering a light detector for detecting the reproduction light and preventing decrease in the Signal to Noise ratio of reproduced information.

On the other hand, it has been proposed to make the optical system for recording and reproducing information small by aligning the optical paths of the signal beam and the reference beam projected onto the holographic recording medium and using a common optical system (See Japanese Patent Application Laid Open No. 2002-123949).

In the proposed arrangement, the recording and reproduction of data and the control of an address servo operation are performed in a time-sharing manner by dividing the reflection surface of a holographic recording medium into a data area and an address servo area, setting the output of a light source to be low when the light projected through an objective lens passes through the address servo area and setting the output of the light source to be high when the light projected through the objective lens passes through the data area.

However, in this method, since an address servo operation is conducted using a signal beam and a reference beam, the address servo area tends to become large, so that the storage capacity is reduced. Further, since the output of the light source has to be modulated, the control operation becomes complicated.

SUMMARY OF THE INVENTION

It is therefore an object of the present invention to provide a method for recording and reproducing holographic data and an apparatus therefor which can prevent noise from being generated in a reproduced beam, prevent the control operation from becoming complicated and prevent storage capacity from being reduced.

The above and other objects of the present invention can be accomplished by a holographic recording and reproducing method for recording data in a holographic recording medium comprising at least a recording layer in which data are to be recorded as phase information of light by projecting a signal beam and a reference beam thereonto and a servo layer disposed on the opposite side of the recording layer as viewed in the direction of signal beam incidence on the holographic recording medium and having regions in which optical modulated patterns are formed by projecting the signal beam and the reference beam onto the holographic recording medium and reproducing holographic data from the holographic recording medium by projecting the reference beam onto the holographic recording medium, the holographic recording and reproducing method comprising steps of setting an optical path of the signal beam so that the signal beam is projected onto other regions of the servo layer than the regions in which the optical modulated patterns are formed, setting an optical path of a servo beam different from that of the signal beam so that the servo beam is projected onto one of the regions of the servo layer in which the optical modulated patterns are formed after passing through an objective lens through which the signal beam passes and projecting the servo beam onto the servo layer along the thus set optical path of the servo beam.

The above and other objects of the present invention can be also accomplished by a holographic recording and reproducing apparatus for recording data in a holographic recording medium comprising at least a recording layer in which data are to be recorded as phase information of light by projecting a signal beam and a reference beam thereonto and a servo layer disposed on the opposite side of the recording layer as viewed in the direction of signal beam incidence on the holographic recording medium and having regions in which optical modulated pattern are formed by projecting the signal beam and the reference beam onto the holographic recording medium and reproducing holographic data from the holographic recording medium by projecting the reference beam onto the holographic recording medium, the holographic recording and reproducing apparatus comprising an objective lens for converging the signal beam, signal beam projecting means for setting an optical path of the signal beam so that the signal beam is projected onto other regions of the servo layer than the regions in which the optical modulated patterns are formed, and servo beam projecting means for setting an optical path of a servo beam different from that of the signal beam so that the servo beam is projected onto one of the regions of the servo layer in which the optical modulated patterns are formed after passing through an objective lens through which the signal beam passes and projecting the servo beam onto the servo layer along the thus set optical path of the servo beam.

According to the present invention, it is possible to prevent noise from being generated in a reproduced beam, prevent the control operation from becoming complicated and prevent storage capacity from being reduced.

In a preferred aspect of the present invention, the servo beam projecting means comprises beam deflecting means for deflecting the servo beam in a predetermined direction so that the servo beam impinges on the objective lens with an incidence angle different from that of the signal beam.

According to this preferred aspect of the present invention, it is possible to impinge the servo beam on the objective lens with an incidence angle different from that of the signal beam.

In a preferred aspect of the present invention, the beam deflecting means is constituted as a diffraction grating disposed on the incidence side of the servo beam with respect to the objective lens.

According to this preferred aspect of the present invention, it is possible to constitute the beam deflecting means by a simple device and use an n-th order diffracted light passing through the diffraction grating as the actual servo beam. Further, even in the case where the optical path of the servo beam coincides with that of the signal beam, the optical path of the servo beam can be changed midway.

The above and other objects and features of the present invention will become apparent from the following description made with reference to the accompanying drawings.

DESCRIPTION OF THE PREFERRED EMBODIMENTS

The principle of the present invention will be first explained with reference to the drawing.

Figure 1:
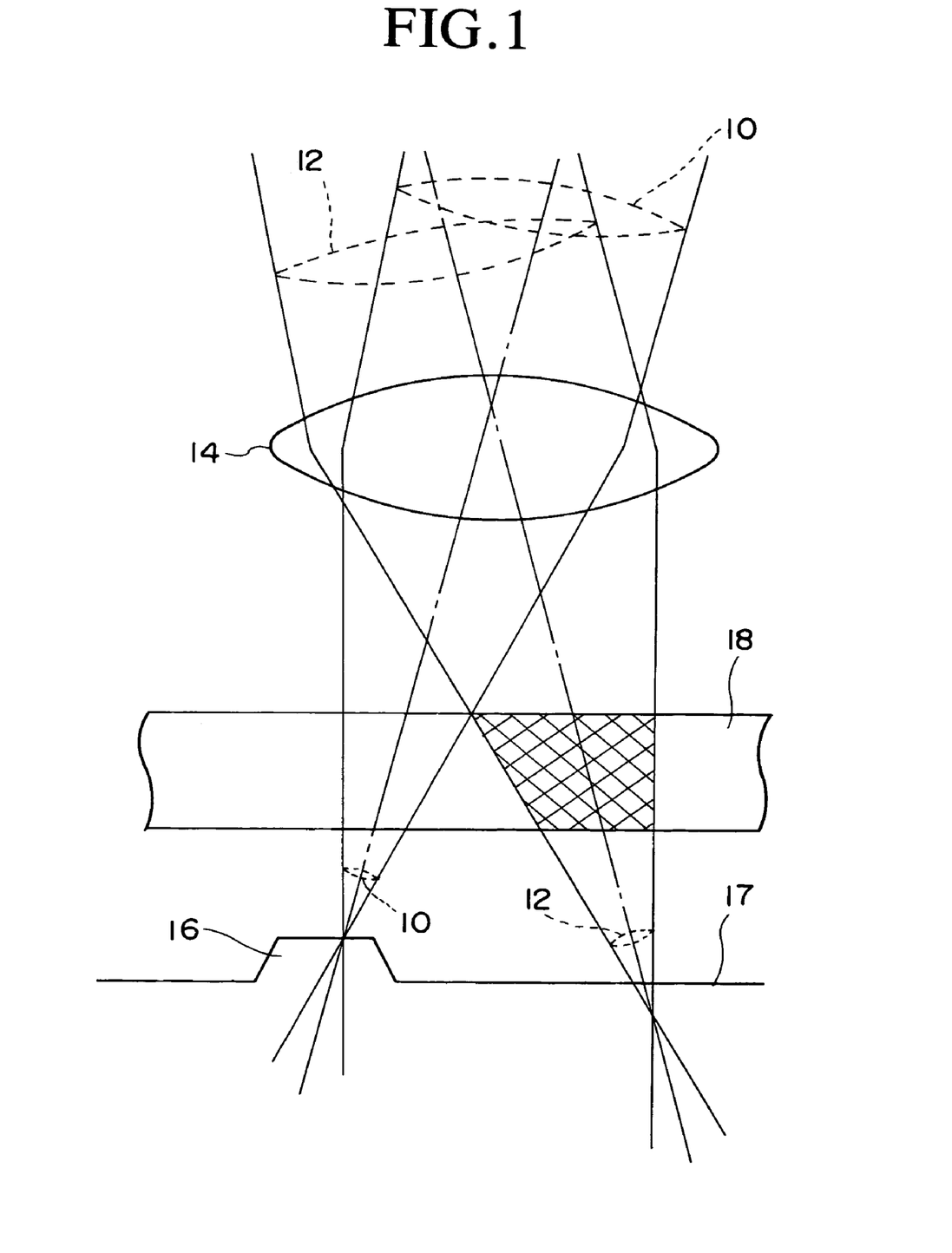
FIG. 1 is a schematic diagram showing the principle of the holographic recording and reproducing of the present invention.

FIG. 1 is a schematic diagram showing the principle of the holographic recording and reproducing of the present invention.

In the present invention, a servo beam is used in addition to a signal beam and a reference beam and an address detection operation and a servo control operation are conducted using information obtained by projecting the servo beam onto a holographic recording medium.

As shown in FIG. 1, in the present invention, a servo beam 10 and a signal beam 12 are converged by a common objective lens (Fourier transform lens) 14 but since the incidence angles of the servo beam 10 and the signal beam 12 to the objective lens 14 are different from each other, the servo beam 10 and the signal beam 12 passing through the objective lens 14 follow different optical paths.

As a result, the servo beam 10 passing through the objective lens 14 is projected onto a region 16 of the holographic recording medium formed with a servo projection 16 while the signal beam 12 passing through the objective lens 14 is projected onto a region 17 of the holographic recording medium formed with no servo projection 16.

The signal beam 12 passes through a recording layer 18 in the holographic recording medium and an interference pattern is three-dimensionally formed by the signal beam 12 and a reference beam (not shown) at a region through which the signal beam 12 and the reference beam pass.

Therefore, if address information and the like corresponding to the respective portions of the recording layer 18 are given to the regions of the holographic recording medium where the servo projections 16 are formed, current address information and the like can be obtained by projecting the servo beam 10 onto the regions of the holographic recording medium where the servo projections 16 are formed.

In this case, since the region where the servo projection 16 is formed is not present on the optical path of the signal beam 12, the region where the servo projection 16 is formed does not serve as a noise source generating noise in a reproduced beam (not shown in FIG. 1). Here, the reproduced beam is a beam obtained by projecting the reference beam onto a region of the recording layer in which an interference pattern is formed and appears on the optical path of the signal beam 12 in both cases when the signal beam 12 and the reference beam are projected with a predetermined angle and when the signal beam 12 and the reference beam are coaxially projected. This means that if the region where the servo projection 16 is formed is not present on the optical path of the signal beam 12, the region where the servo projection 16 is formed is not present on the optical path of the reference beam and noise can be therefore reduced.

Next, preferred embodiments of the present invention will be described in detail with reference to the accompanying drawings.

Figure 2:
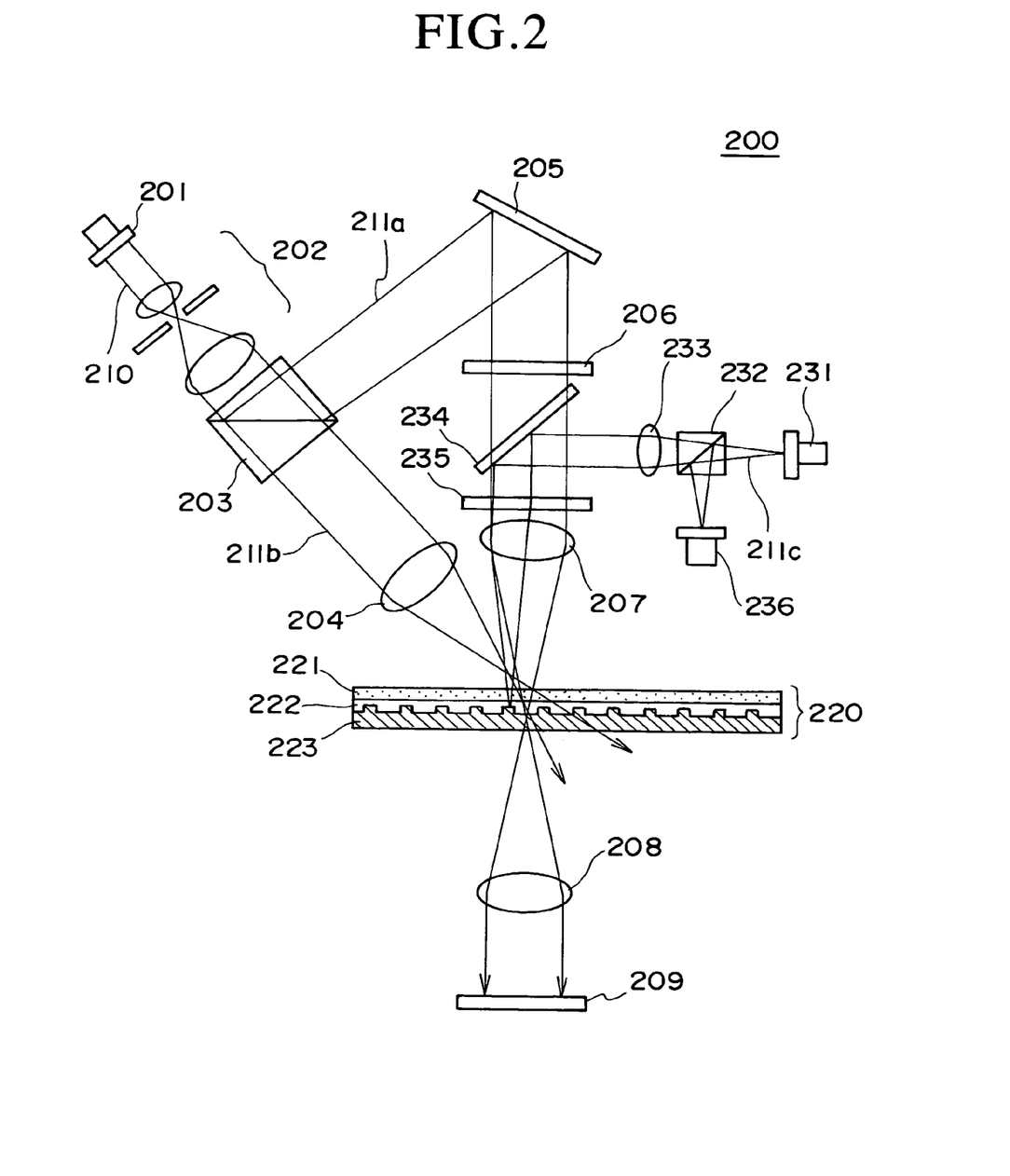
FIG. 2 is a schematic diagram showing a holographic recording and reproducing apparatus that is a preferred embodiment of the present invention.

FIG. 2 is a schematic diagram showing a holographic recording and reproducing apparatus that is a preferred embodiment of the present invention.

As shown in FIG. 2, a holographic recording and reproducing apparatus 200 includes a laser beam source 201 for emitting a laser beam 210 having a wavelength of λ0 and adapted for recording data or reproducing data, a beam expander 202 for expanding a laser beam 210 emitted from the laser beam source 201, a beam splitter 203 for splitting the expanded laser beam 210 to generate a signal beam 211a and a reference beam 211b, and a Fourier transform lens 204 disposed on the optical path of the reference beam 211b.

Further, as shown in FIG. 2, there are provided a total reflection mirror 205 for changing the optical path of the signal beam 211a so that the signal beam 211a impinges on a holographic recording medium 220 perpendicularly thereto, a spatial light modulator (SLM) 206 for modulating the signal beam 211a, a Fourier transform lens 207, a reverse Fourier transform lens 208 and a CCD image sensor 209.

The holographic recording medium 220 is disposed between the Fourier transform lens 207 and the reverse Fourier transform lens 208. The optical paths of the signal beam 211a and the reference beam 211b are determined so that the signal beam 211a and the reference beam 211b overlap each other at a predetermined position in the holographic recording medium 220 when data are recorded in the holographic recording medium 220.

As shown in FIG. 2, the holographic recording and reproducing apparatus 200 further includes a laser beam source 231 for a servo control operation that generates a laser beam (servo beam) 211c having a wavelength λ1 different from the wavelength λ0 of the signal beam 211a and the reference beam 211b, a beam splitter 232, a collimator 233, a dichroic mirror 234, a diffraction grating 235 and a photo-detector 236.

It is preferable for the wavelength λ1 of the servo beam 211c to be longer than the wavelength λ0 of the signal beam 211a and the reference beam 211b but since the resolving power is lowered if the wavelength λ1 of the servo beam 211c is too long, it is necessary to appropriately determine the wavelength λ1 of the servo beam 211c.

On the other hand, in this embodiment, a transmission-type holographic recording medium 220 is used. As shown in FIG. 2, the holographic recording medium 220 includes a recording layer 221, an intermediate layer 222 and a servo layer 223 laminated in this order.

Figure 3:
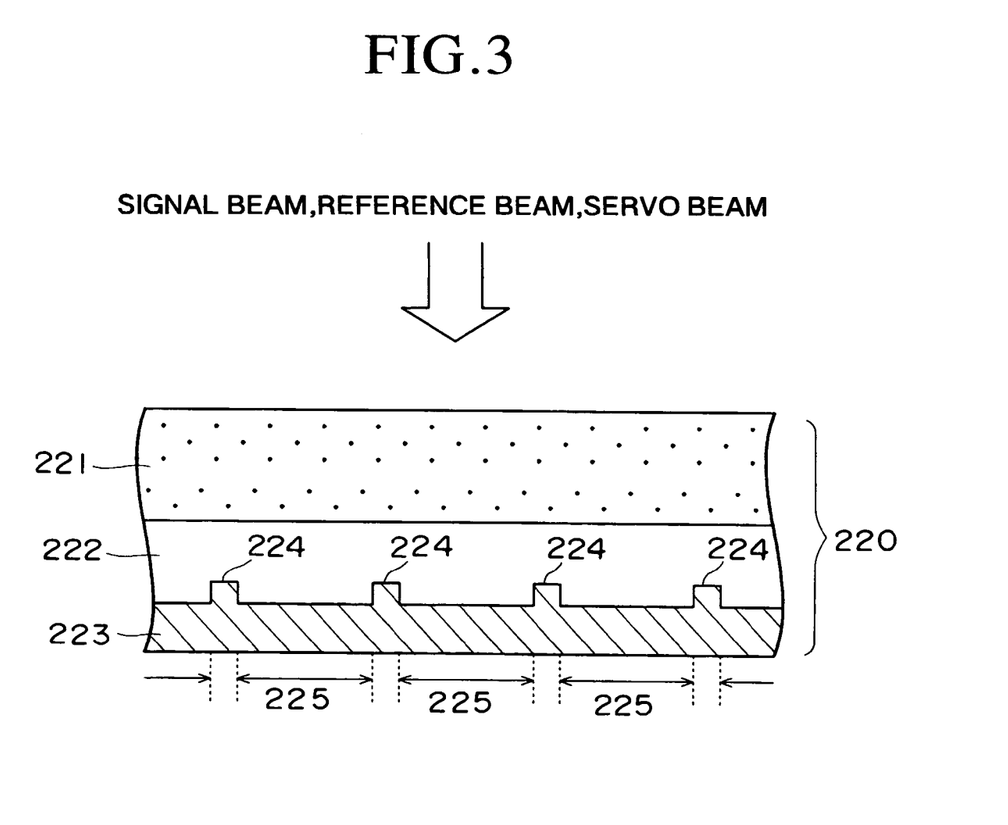
FIG. 3 is a schematic cross-sectional view showing the structure of a holographic recording medium.

FIG. 3 is a schematic cross-sectional view showing the structure of the holographic recording medium 220.

The recording layer 221 shown in FIG. 3 is a layer in which data are to be recorded utilizing holography as phase information of light and is formed of a photosensitive material whose optical properties such as a refractive index, a dielectric constant, a reflection coefficient and the like vary in accordance with the intensity of light when the light is reflected thereby. As a photosensitive material for forming the recording layer 221, a photosensitive material having high sensitivity with respect to the signal beam 211a and the reference beam 211b and low sensitivity with respect to the servo beam 211c is employed. Otherwise, a servo beam 211c having a wavelength λ1 which does not influence the recording layer 221 is employed. Holographic materials usable for forming the recording layer 221 include photopolymer "HRF-600" (Product Name) manufactured by DuPont, photopolymer "ULSH-500" (Product Name) manufactured by Aprilis, Inc. and the like.

The intermediate layer 222 is a layer formed between the recording layer 221 and the servo layer 223 and is formed of a material having high light transmittance.

The servo layer 223 is a layer formed with servo pits on the surface on the incidence side of the servo beam 211c. In this embodiment, since the holographic recording material 220 is of the transmission type, the servo layer 223 is constituted so as to allow the signal beam 211a and the reference beam 211b having a wavelength λ0 to transmit therethrough and reflect at least a part of the servo beam 211c thereby.

Substantially band-like regions each formed with a servo projection 224 and regions 225 formed with no servo projection 224 are alternately formed on the surface of the servo layer 223. Specifically, the regions of the servo layer 223 each formed with a servo projection 224 serve as servo tracks and the flat regions 225 are formed between neighboring servo tracks. The signal beam 211a is projected onto the flat regions 225 and the servo beam 211c is projected onto the servo tracks. The region of the recording layer 221 through which the light beam is transmitted is defined as a region of the recording layer 221 through which an amount of light equal to $1/e^2$ of the maximum intensity of the light beam passes.

The laser beam 210 emitted from the laser beam source 201 for recording data or reproducing data passes through the beam expander 202, whereby the beam is expanded in diameter and made a parallel beam, whereafter the laser beam 210 is split by the beam splitter 203 into the signal beam 211a and the reference beam 211b.

The signal beam 211a enters the spatial light modulator 206 via the total reflection mirror 205.

The spatial light modulator 206 has a large number of pixels arranged in a matrix and spatially modulates the intensity of the beam by selectively passing or blocking the light beam at each pixel, thereby generating a signal beam 211a carrying information. A liquid crystal device, for example, is employed as the spatial light modulator 206. Otherwise a DMD (digital micro-mirror device) can be used.

During recording, the data to be recorded are converted into two-dimensional dot matrix components by an encoder (not shown) and input into the spatial light modulator 206. The intensity of the signal beam 211a is spatially modulated by selectively passing or blocking the signal beam at each pixel. The signal beam 211a passing through the spatial light modulator 206 further passes through the dichroic mirror 234 and impinges on the diffraction grating 235.

The diffraction grating 235 generates a diffraction beam of the signal beam 211a impinged thereon. Here, when data are actually recorded in or reproduced from the holographic recording medium 220, a direct beam (zero-th order diffracted beam) passing through the diffraction grating 235 is used, i.e., a diffracted beam is not used. Although an interference pattern is also formed by the overlap of the diffracted beam of the signal beam 211a and the reference beam 211b, since this interference pattern constitutes noise with respect to information to be recorded, it is preferable that the diffracted beam of the signal beam 211a be as small as possible and more preferable that no diffracted beam of the signal beam 211a be generated at all.

The zero-th order diffracted beam of the signal beam 211a (hereinafter sometimes referred to merely as "signal beam") emitted from the diffraction grating 235 passes through the Fourier transform lens 207 and impinges on the holographic recording medium 220.

On the other hand, the reference beam 211b only passes through the Fourier transform lens 207 and impinges on the holographic recording medium 220.

The signal beam 211a and the reference beam 211b are projected onto the same position in the holographic recording medium 220, so that the signal beam 211a and the reference beam 211b overlap. Thus, an interference pattern is formed by interference of the signal beam 211a and the reference beam 211b, whereby data are recorded in the holographic recording medium 220 as phase information of light.

When data are to be reproduced, all of the pixels of the spatial light modulator 206 are turned off, thereby blocking the signal beam 211a.

Therefore, the holographic recording medium 220 is irradiated with only the reference beam 211b. The intensity of the reference beam 211b projected onto the recording position in the holographic recording medium 220 is modulated by the interference pattern and a beam carrying information is reproduced.

The thus reproduced beam, which has been diffracted by the interference pattern in the direction of the optical axis of the signal beam 211a, enters the reverse Fourier transform lens 208. Reverse Fourier transformation is effected on the reproduced beam by the reverse Fourier transform lens 208, whereby the reproduced beam is transformed into a beam including dot matrix components and made parallel. The beam then enters the CCD image sensor 209, which converts the intensity of the beam into electrical digital signals at each pixel thereof. The signals are decoded to the original data by a decoder (not shown).

When a servo control operation is effected, the servo beam 211c emitted from the laser beam source 231 passes through the beam splitter 232 and the collimator 233, whereby the servo beam 211c is made a parallel beam. The servo beam 211c is then reflected by the dichroic mirror 234 and impinges on the diffraction grating 235.

At this time, although an n-th order diffracted beam of the servo beam 211 is generated by the diffraction grating 235, in this embodiment, a primary diffracted beam of the servo beam 211c is used for a servo control operation.

The primary diffracted beam of the servo beam 211c (hereinafter sometimes referred to merely as "servo beam") emitted from the diffraction grating 235 passes through the Fourier transform lens 207 and is converged by the Fourier transform lens 207 onto the holographic recording medium 220 so as to be focused onto one of the region of the servo layer 223 formed with the servo pits 224 in the holographic recording medium 220.

The servo beam 211c is deflected by the diffraction grating 235 in this manner. As a result, the servo beam 211c impinges on the Fourier transform lens 207 at an incidence angle different from that at which the signal beam 211a impinges on the Fourier transform lens 207 and is projected onto the spot position on the servo track different from that of the signal beam 211a.

Here, since the wavelength λ1 of the servo beam 211c is different from the wavelength λ0 of the signal beam 211a and the reference beam 211b, it is possible to set a diffracted angle of the servo beam 211c and select the wavelength λ1 of the servo beam 211c in accordance with the track pitch without being restricted by wavelength conditions for recording data or reproducing data. A case where the pitch of the concavo-convex pattern is particularly wide can be dealt with by setting the wavelength λ1 to be sufficiently longer than the wavelength λ0.

The servo beam 211c is reflected by the servo track to be returned along the original optical path as a returning beam and impinges on the photo-detector 236 via the Fourier transform lens 207, the diffraction grating 235, the dichroic mirror 234, the collimator 233 and the beam splitter 232.

The intensity and intensity distribution of the servo beam 211c are detected by the photo-detector 236. The output of the photo-detector 236 is then processed to conduct a focus servo operation and a tracking servo operation and also generate a reference clock signal and conduct address discrimination.

Figure 4:
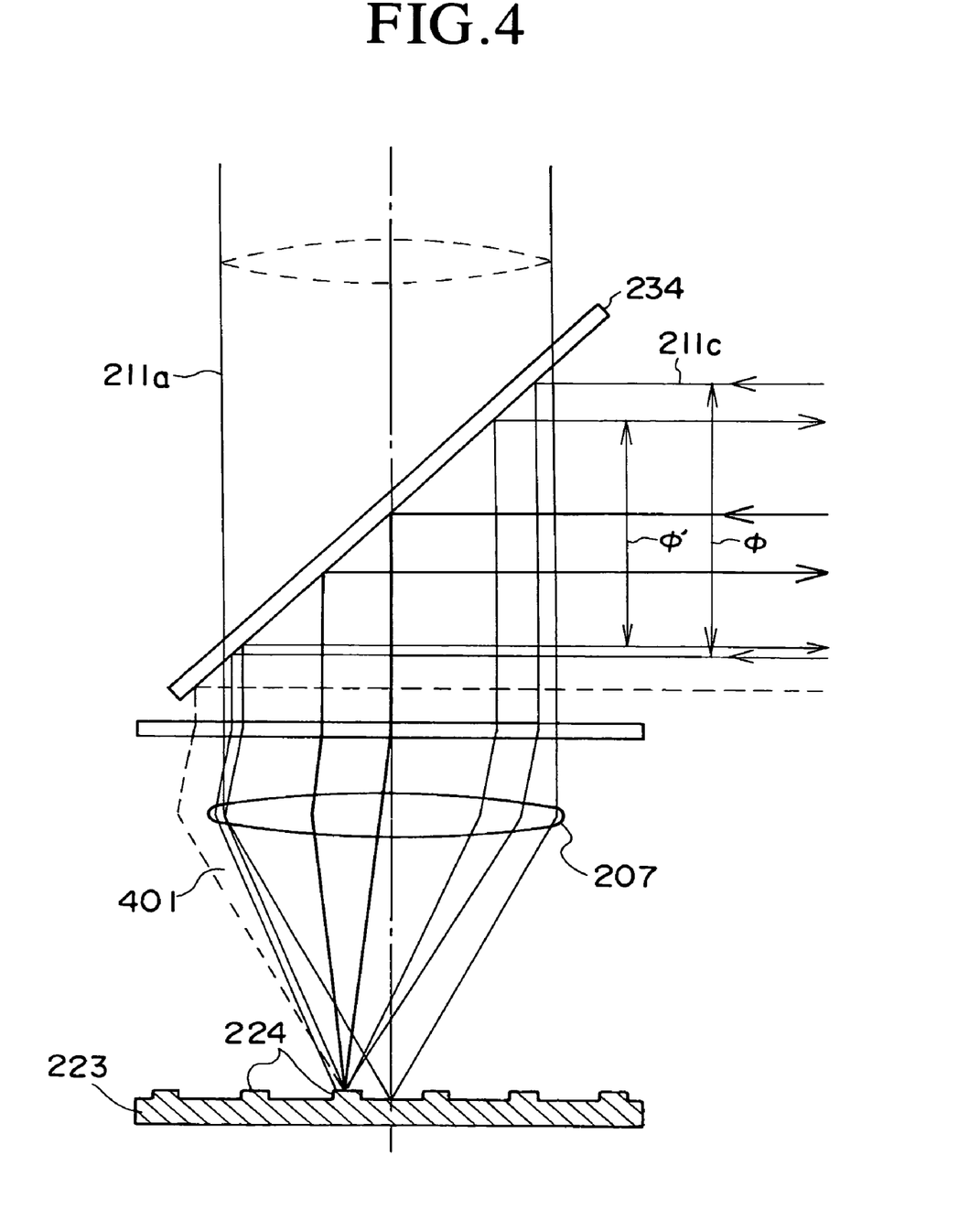
FIG. 4 is a schematic diagram for showing details of optical paths of a signal beam and a servo beam.

FIG. 4 is a schematic diagram for showing the details of the optical paths of the signal beam 211a and the servo beam 211c.

As shown in FIG. 4, when the servo beam 211c having a predetermined beam diameter ϕ is impinged on the dichroic mirror 234, the servo beam 211c is reflected by the dichroic mirror 234 and advances to the diffraction grating 235.

The optical axis of the servo beam 211c is tilted by the diffraction grating 235 and then advances to the Fourier transform lens 207. The Fourier transform lens 207 converges the servo beam 211c and projects it onto one of the regions of the servo layer 223 formed with the servo projections 224 located at a position different from that of the region through which the signal beam 211a passes.

The servo beam 211c is then reflected by the region of the servo layer 223 formed with the servo projection 224 and is again impinged on the Fourier transform lens 207. At this time, a part 401 of the servo beam 211c strays outside of the Fourier transform lens 207 so that a loss arises. Most of the servo beam 211c advancing to the Fourier transform lens 207 passes through the diffraction grating 235 and is reflected by the dichroic mirror 234, thereby advancing toward the photo-detector 236. Although the thus returned beam of the servo beam 211c has a beam diameter ϕ' smaller than the beam diameter ϕ of the servo beam 211c projected onto the Fourier transform lens 207, it can be used for a servo control operation.

As described above, in this embodiment, the signal beam 211a is projected onto the holographic recording medium 220 so as to pass through a region 225 of the servo layer 223 other than the regions of the servo layer 223 formed with the servo projections 224 and the incidence angle at which the servo beam 211c passing through the Fourier transform lens 207 through which the signal beam 211a also passes is projected onto the holographic recording medium 220 is tilted using the diffraction grating 235 so that the servo beam 211c is projected onto one of the regions of the servo layer 223 in which the servo projections 224 are formed. Therefore, according to this embodiment, it is possible to prevent noise from being generated in the reproduced beam.

Figure 5:
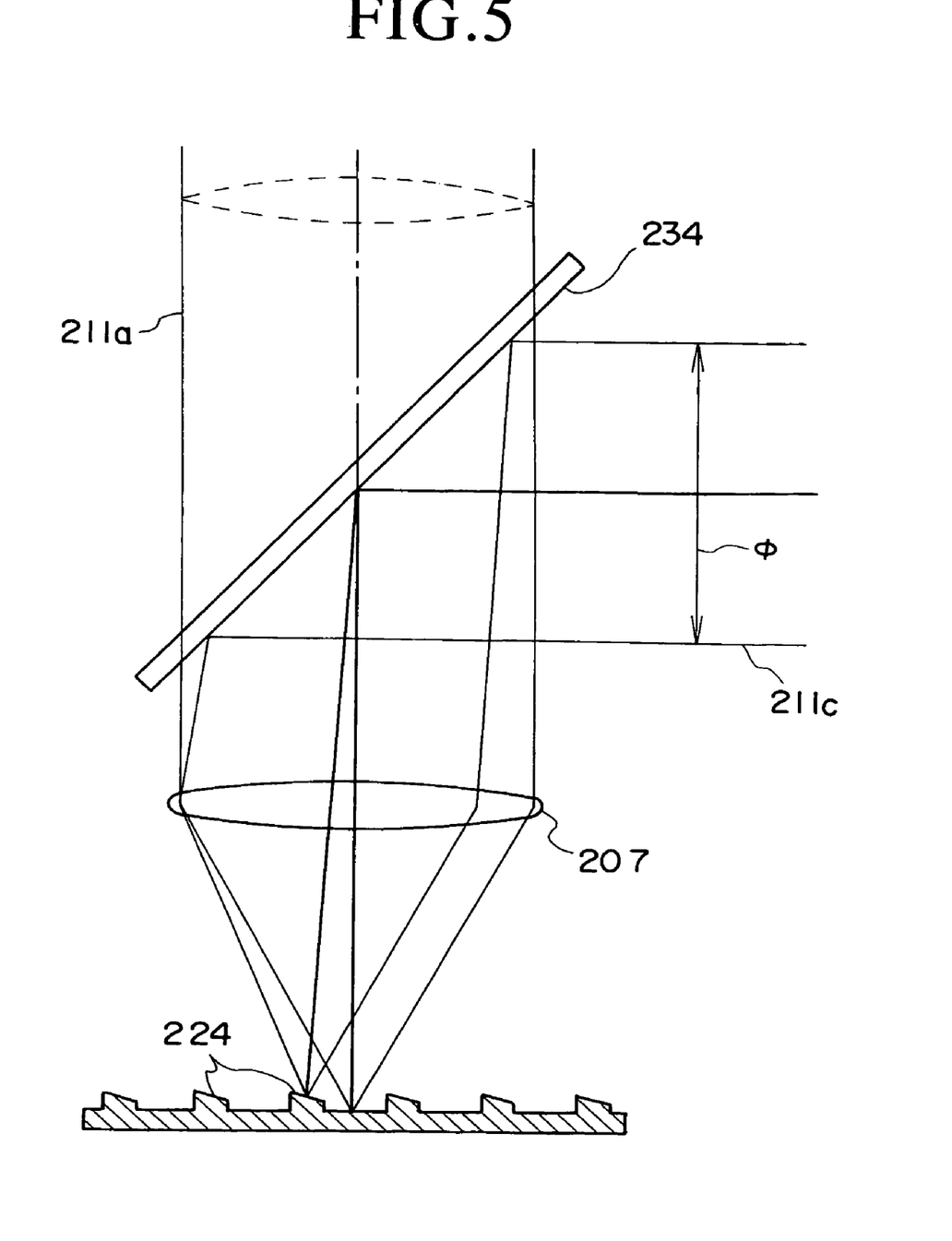
FIG. 5 is a schematic diagram showing a holographic recording and reproducing apparatus that is another preferred embodiment of the present invention.

FIG. 5 is a schematic diagram showing a holographic recording and reproducing apparatus that is another preferred embodiment of the present invention.

As shown in FIG. 5, in this embodiment, instead of the diffraction grating 235, the dichroic mirror 234 is used to tilt the optical axis of the servo beam 211c, and a concavo-convex surface of each of the regions where the servo projections 224 are formed obliquely. The concavo-convex surface of each of the regions where the servo projections 224 are formed is given an angle so as to be perpendicular to the optical axis of the servo beam 211c.

When the servo beam 211c having a predetermined beam diameter ϕ is impinged on the dichroic mirror 234, the servo beam 211c is reflected by the dichroic mirror 234. At this time, the optical axis of the servo beam 211c is tilted by a predetermined angle with respect to the optical axis of the signal beam 211a.

The servo beam 211c advances to the Fourier transform lens 207 and is condensed onto the servo projection 224 located at a different position from that of a region through which the signal beam 211a passes.

The servo beam 211c reflected by the servo projection 224 returns along the incidence path to pass through the Fourier transform lens 207 be reflected by the dichroic mirror 234 and advance toward the photo-detector 236. Unlike in the previous embodiment, the thus returned servo beam 211c does not stray outside of the Fourier transform lens 207 so that no loss arises. It therefore has the same beam diameter ϕ as that of the incident servo beam 211c.

As described above, in this embodiment, the signal beam 211a is projected onto the holographic recording medium 220 so as to be focused onto the reflection surface thereof. Further, the angle at which the servo beam 211c is impinged on the holographic recording medium 220 is tilted using the dichroic mirror 234 and the concavo-convex surface of each of the regions of the servo layer 223 where the servo projections 224 are formed is correspondingly angled. Therefore, it is possible to prevent noise from being generated in a reproduced beam without using a diffraction grating and further to prevent loss of part of the servo beam 211c during the return of the servo beam 211c along its optical path.

Figure 6:
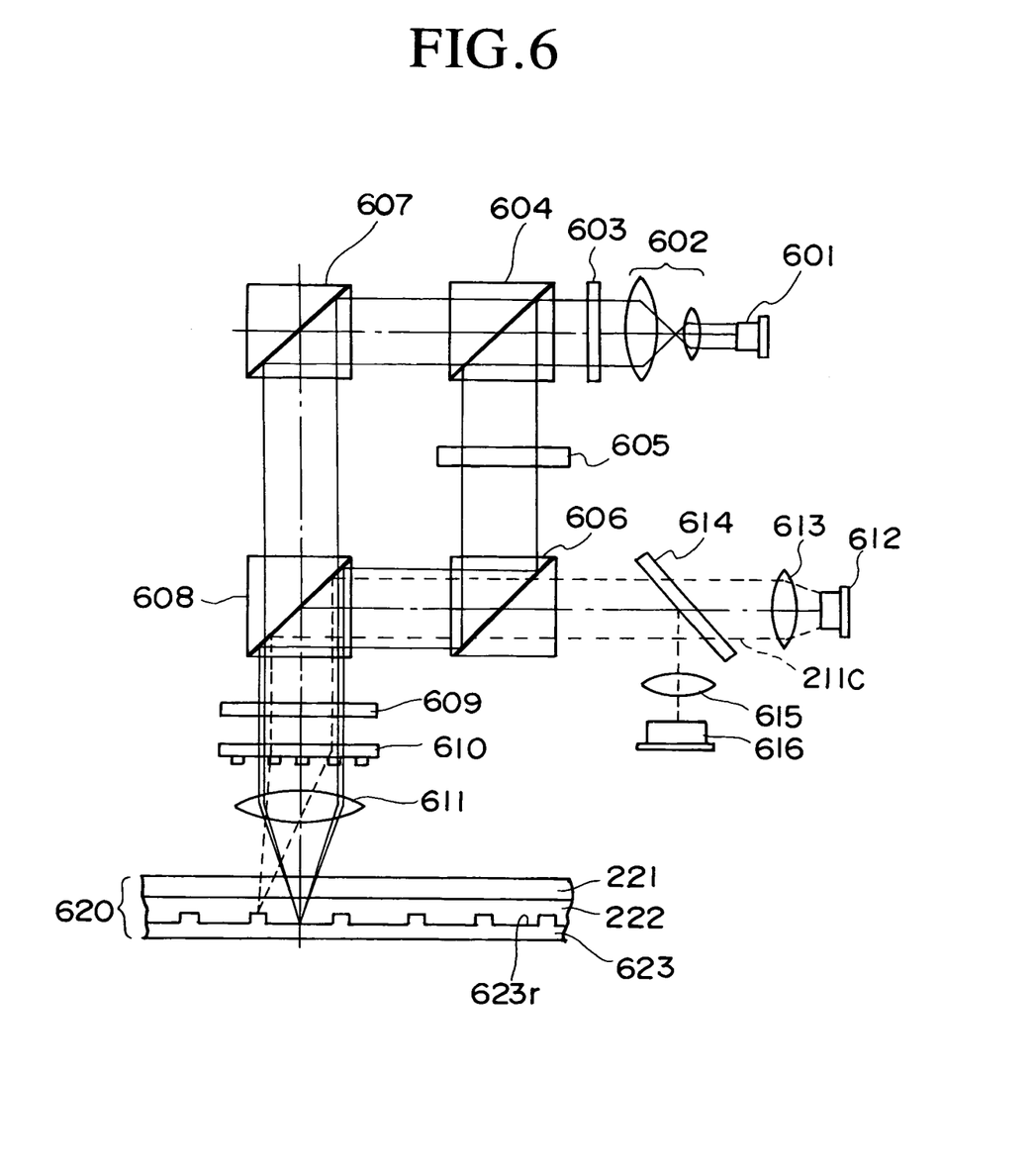
FIG. 6 is a schematic diagram showing a holographic recording and reproducing apparatus that is a further preferred embodiment of the present invention.

FIG. 6 is a schematic diagram showing a holographic recording and reproducing apparatus that is a further preferred embodiment of the present invention.

As shown in FIG. 6, the holographic recording and reproducing apparatus according to this embodiment is constituted as a so-called polarization colinear type holographic recording and reproducing apparatus in which a signal beam and a reference beam are projected so as to have a common optical axis. In the polarization colinear type holographic recording and reproducing apparatus, a reflection-type holographic recording medium 620 is used. Therefore, the surface of a servo layer 623 formed with servo projections constitutes a reflection surface 623r which reflects not only a servo beam having a wavelength of λ1 but also a signal beam and a reference beam each having a wavelength of λ0.

A linear polarized laser beam emitted from a laser beam source 601 for recording data and reproducing data passes through a beam expander 602, whereby it is enlarged in diameter and is then optically rotated by a rotating optical element 603, thereby generating a beam containing an S polarization component and a P polarization component.

The thus generated beam enters a first polarizing beam splitter 604, thereby dividing it into the S polarization component and the P polarization component. The S polarization component is modulated by a spatial light modulator 605 to generate a signal beam having a predetermined pattern.

The signal beam advances to a second polarizing beam splitter 608 via a first beam splitter 606. On the other hand, the P polarization component generated by dividing the above mentioned beam by the first polarizing beam splitter 604 advances to the second polarizing beam splitter 608 via a second beam splitter 607 for use as a reference beam.

After alignment of their optical axes by the second polarizing beam splitter 608, the signal beam and the reference beam advance to a double optically rotating plate 609.

The double optically rotating plate 609 includes a polarizing plate disposed on the right side of the optical path and a polarizing plate disposed on the left side of the optical path. The polarizing plate disposed on the right side is constituted so as to rotate the direction of polarization by −45 degrees and the polarizing plate disposed on the left side is constituted so as to rotate the direction of polarization by +45 degrees.

When data are to be recorded, the reference beam consisting of the P polarization component and the signal beam consisting of the S polarization component are each optically rotated by the double optically rotating plate 609 in two different directions each corresponding to a region obtained by dividing the beam cross-section in two.

The signal beam and the reference beam advance to a diffraction grating 610. As a result, diffracted beams of the signal beam and the reference beam are generated but zero-th order diffracted beams (direct light beams) are used as the signal beam and the reference beam.

The signal beam and the reference beam advance to the holographic recording medium 620. On a recording layer 221 of the holographic recording medium 620, the signal beam which has not yet reached the reflection surface 623r and the reference beam for recording data reflected by the reflection surface 623r interfere with each other to form an interference pattern, thereby recording data in the recording layer 221.

When a servo control operation is conducted, a laser beam (servo beam) emitted from a laser beam source 612 for servo control and consisting of an S polarization component passes through a collimator 613, a mirror 614, the first beam splitter 606, the second polarizing beam splitter 608 and the double optically rotating plate 609 to impinge on the diffraction grating 610. At this time, n-th diffracted beams of the servo beam are generated by the diffraction grating 610 but in this embodiment, a primary diffracted beam of the servo beam is used for servo control.

The primary diffracted beam of the servo beam (hereinafter sometimes referred to merely as "servo beam") passes through a Fourier transform lens 611 and is converged onto the holographic recording medium 620 so as to be focused on the reflection surface 623r thereof.

The servo beam is deflected by the diffraction grating 610 in this manner. As a result, the servo beam impinges on the Fourier transform lens 611 at an incidence angle different from that at which the signal beam impinges on the Fourier transform lens 611 and is projected onto a spot position on the servo track different from that of the signal beam.

The servo beam is reflected by the servo track to be returned along the original optical path as a returning beam and passes through the Fourier transform lens 611, the diffraction grating 610, the double optically rotating plate 609, the second polarizing beam splitter 608 and the first beam splitter 606 and to impinge on the mirror 614. The servo beam is reflected by the mirror 614 and advances to a photo-detector 616 via a condenser lens 615.

The intensity and the intensity distribution of the servo beam are detected by the photo-detector 616. The output of the photo-detector 616 is then processed to conduct a focus servo operation and a tracking servo operation and also generate a reference clock signal and conduct address discrimination.

As described above, in this embodiment, even in the case where the signal beam and the reference beam are coaxially projected onto the holographic recording medium 620, the signal beam and the reference beam are projected onto the holographic recording medium 620 so as to pass through a region other than the regions formed with the servo projections and the incidence angle at which the servo beam passing through the Fourier transform lens 611 through which the signal beam and the reference beam also pass is projected onto the holographic recording medium 620 is tilted using the diffraction grating 610 so that the servo beam is projected onto one of the region in which the servo projections are formed. Therefore, according to this embodiment, it is possible to prevent noise from being generated in a reproduced beam.

The present invention has thus been shown and described with reference to specific embodiments. However, it should be noted that the present invention is in no way limited to the details of the described arrangements but changes and modifications may be made without departing from the scope of the appended claims.

For example, although in the above described embodiments the part of the servo beam reflected from the holographic recording medium 220, 620 that returns to the Fourier transform lens 207, 611 is used for servo control, it is not absolutely necessary to use the part of the servo beam reflected from the holographic recording medium 220, 620 that returns to the Fourier transform lens 207, 611 for servo control. For example, it is possible to increase the angle of the servo beam diffracted by the diffraction grating 23, thereby changing the optical path of the servo beam reflected by the holographic recording medium 220, 620 and dispose a photo-detector at a position where the servo beam reflected by the holographic recording medium 220, 620 directly impinges thereon or impinges thereon via a desired optical component(s). In the case where the angle of the servo beam diffracted by the diffraction grating 23 is increased, the servo beam impinges on the reflection surface of the holographic recording medium 220, 620 at a greater angle and the amount of the servo beam reflected by the holographic recording medium 220, 620 and entering the Fourier transform lens 207, 611 as a returned beam becomes small. It therefore becomes possible to effectively detect the servo beam reflected from the holographic recording medium 220, 620 by disposing a photo-detector in a direction in which the servo beam reflected from the holographic recording medium 220, 620 advances.

Further, in the embodiment shown in FIG. 2, although the optical axis of the signal beam and the optical axis of the servo beam are made different using the diffraction grating 235, it is not absolutely necessary to use the diffraction grating 235 to make the optical axis of the signal beam and the optical axis of the servo beam different and any means capable of deflecting the servo beam in a predetermined direction suffices. For example, the optical axis of the signal beam and the optical axis of the servo beam can be made different using a plane mirror having a discontinuous region along the axis perpendicular to the surface thereof or a concave mirror may be used for making the optical axis of the signal beam and the optical axis of the servo beam different. It is further possible to use a liquid crystal panel capable of deflecting a light beam in pixel units by refraction.

Furthermore, in the above described embodiments, the descriptions were made as to the case where the servo projections were formed on the servo tracks formed on the servo layer of the holographic recording medium 220, 620. However, it is not absolutely necessary for the servo projections to be formed on the servo tracks formed on the servo layer of the holographic recording medium 220, 620 and it is sufficient that an optical pattern capable of modulating a servo beam projected thereonto by varying optical constants of servo tracks, shielding servo tracks with a mask or the like is formed on the servo tracks formed on a servo layer of the holographic recording medium. Further, the holographic recording medium is not particularly limited and any of various types of holographic recording media such as card-like, block-like, stick-like or the like can be selected.

According to the present invention, it is possible to provide a method for recording and reproducing holographic data and an apparatus therefor which can prevent noise from being generated in a reproduced beam, prevent the control operation from becoming complicated and prevent storage capacity from being decreased.

The invention claimed is:

1. A holographic recording and reproducing method a) for recording data in a holographic recording medium comprising at least a recording layer in which data are to be recorded as phase information of light by projecting a signal beam and a reference beam emitted from a first light source and having a wavelength $\lambda 0$ thereonto and a servo layer disposed on an opposite side of the recording layer as viewed in a direction of signal beam incidence on the holographic recording medium, the holographic recording medium having regions in which servo projection structures are formed and b) for reproducing holographic data from the holographic recording medium by projecting the reference beam onto the holographic recording medium, the holographic recording and reproducing method comprising:

setting a first optical path of the signal beam so that the signal beam is projected onto other regions of the servo layer than regions in which the servo projection structures are formed; and setting a second optical path, different than the first optical path, of a servo beam emitted from a second light source and having a wavelength $\lambda 1$ different from that of the signal beam so that the servo beam is projected onto one of the regions of the servo layer in which the servo projection structures are formed after passing through an objective lens through which the signal beam passes and projecting the servo beam onto the servo layer along the thus set optical path of the servo beam, the servo beam being emitted from the second light source at a same time as the signal beam and the reference beam are emitted from the first light source.

2. A holographic recording and reproducing apparatus a) for recording data in a holographic recording medium comprising at least a recording layer in which data are to be recorded as phase information of light by projecting a signal beam and a reference beam thereonto and a servo layer disposed on an opposite side of the recording layer as viewed in a direction of signal beam incidence on the holographic recording medium, the holographic recording medium having regions in which servo projection structures are formed and b) for reproducing holographic data from the holographic recording medium by projecting the reference beam onto the holographic recording medium, the holographic recording and reproducing apparatus comprising:

signal beam path setting means including an objective lens for converging the signal beam and adapted for setting a first optical path of the signal beam so that the signal beam is projected onto other regions of the servo layer than regions in which the servo projection structures are formed;

servo beam path setting means for setting a second optical path of a servo beam different from the first optical path of the signal beam so that the servo beam is projected onto one of the regions of the servo layer in which the servo projection structures are formed after passing through an objective lens through which the signal beam passes and projecting the servo beam onto the servo layer along the thus set optical path of the servo beam;

a first light source to emit the signal beam and the reference beam having a wavelength $\lambda 0$; and a second light source to emit the servo beam having a wavelength $\lambda 1$, the first light source and the second light source being driven simultaneously, thereby simultaneously emitting the signal beam, the reference beam, and the servo beam.

3. A holographic recording and reproducing apparatus in accordance with claim 2, wherein the servo beam projecting means comprises beam deflecting means for deflecting the servo beam in a predetermined direction so that the servo beam impinges on the objective lens with an incidence angle different from that of the signal beam.

4. A holographic recording and reproducing apparatus in accordance with claim 3, wherein the beam deflecting means comprises a diffraction grating disposed on an incidence side of the servo beam with respect to the objective lens.

5. A holographic recording and reproducing method a) for recording data in a holographic recording medium comprising at least a recording layer in which data are to be recorded as phase information of light by projecting a signal beam and a reference beam emitted from a first light source and having a wavelength $\lambda 0$ thereonto and a servo layer disposed on an opposite side of the recording layer as viewed in a direction of signal beam incidence on the holographic recording medium, the servo layer having servo projection structures b) for reproducing holographic data from the holographic recording medium by projecting the reference beam onto the holographic recording medium, the holographic recording and reproducing method comprising:

setting a first optical path of the signal beam so that the signal beam is projected onto a first region of the servo layer different from second regions of the servo layer on which the servo projection structures are formed;

setting a second optical path, different than the first optical path, of a servo beam emitted from a second light source and having a wavelength $\lambda 1$ different from that of the signal beam so that the servo beam is projected onto one of the second regions of the servo layer on which the servo projection structures are formed, after passing through an objective lens through which the signal beam passes; and projecting the servo beam onto the servo layer along the thus set second optical path of the servo beam, wherein the servo beam is emitted from the second light source at a same time as the signal beam and the reference beam are emitted from the first light source.

* * * * *